(12) United States Patent
Daniel

(10) Patent No.: US 7,073,638 B2
(45) Date of Patent: Jul. 11, 2006

(54) HIGH EFFICIENCY BRAKE FOR AGRICULTURAL DRIVE SYSTEMS

(76) Inventor: Jeffrey K. Daniel, 7502 Mesa Rd., Houston, TX (US) 77028

( * ) Notice: Subject to any disclaimer, the term of this patent is extended or adjusted under 35 U.S.C. 154(b) by 0 days.

(21) Appl. No.: 10/766,492

(22) Filed: Jan. 28, 2004

(65) Prior Publication Data

US 2005/0164822 A1    Jul. 28, 2005

(51) Int. Cl.
*B60T 7/12* (2006.01)
*F16D 67/00* (2006.01)

(52) U.S. Cl. .................................. 188/134; 192/223.3

(58) Field of Classification Search ............... 188/134, 188/71.2, 72.7; 192/223.2, 223.3, 56.55, 192/56.57; 475/5

See application file for complete search history.

(56) References Cited

U.S. PATENT DOCUMENTS

| | | | |
|---|---|---|---|
| 3,667,578 A * | 6/1972 | Johnson | 192/223.3 |
| 4,693,425 A * | 9/1987 | Meis et al. | 239/735 |
| 4,834,225 A * | 5/1989 | Klopfenstein et al. | 188/134 |
| 4,909,363 A * | 3/1990 | Trommer | 192/223.3 |
| 5,299,666 A * | 4/1994 | Lang et al. | 188/134 |
| 5,944,148 A * | 8/1999 | Bae et al. | 188/134 |
| 6,769,527 B1 * | 8/2004 | Paris | 192/223.3 |

* cited by examiner

*Primary Examiner*—Thomas Williams
(74) *Attorney, Agent, or Firm*—Jackson Walker L.L.P.; Mark A. Tidwell

(57) ABSTRACT

A high efficiency drivetrain for an agricultural irrigation system is described. The drivetrain includes a ball ramp brake to inhibit movement of a wheel tower when the drive gear motor is not engaged. In one embodiment, the ball ramp brake is a bi-directional ball ramp brake disposed between the drive gear motor and the gearbox of the drivetrain. Utilizing a ball ramp brake such as this, the gearbox can incorporate much more highly efficient gearing mechanisms, such as for example only, involute gears, beveled gears, hypoid gears, planetary gears or the like. The ball ramp brake is enclosed and includes an oil bath that functions to lubricate the components of the brake, preventing corrosion and dissipating heat.

25 Claims, 2 Drawing Sheets

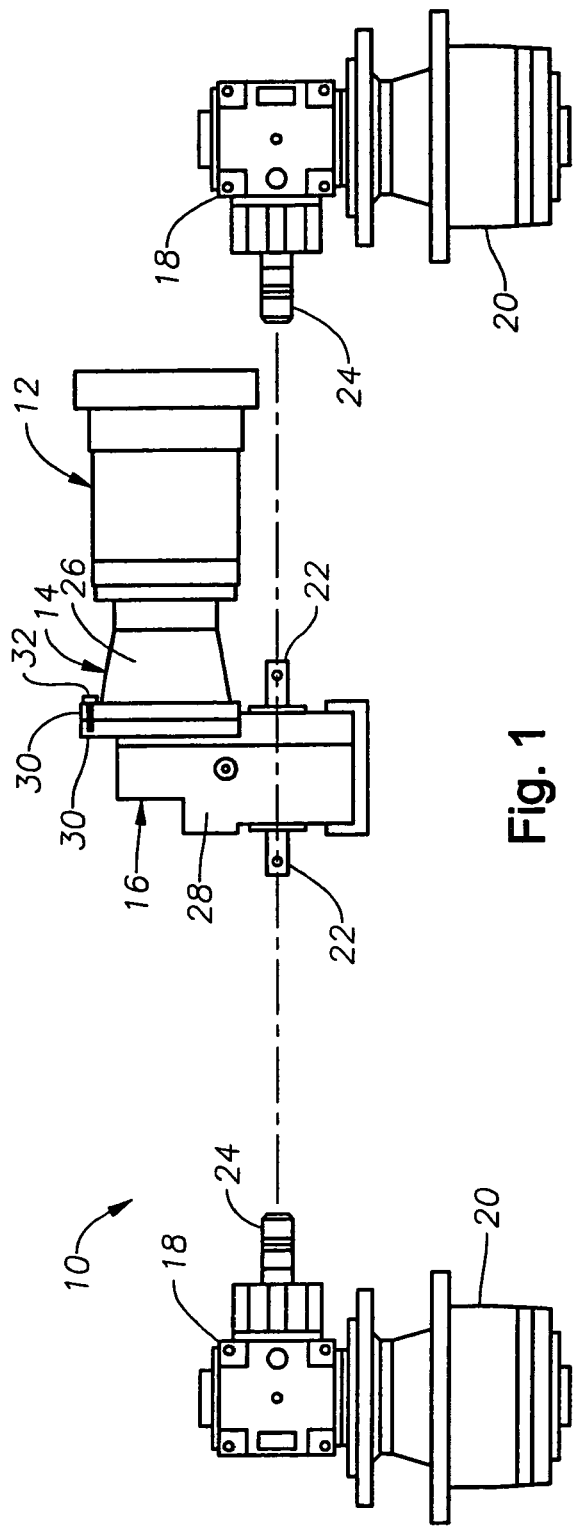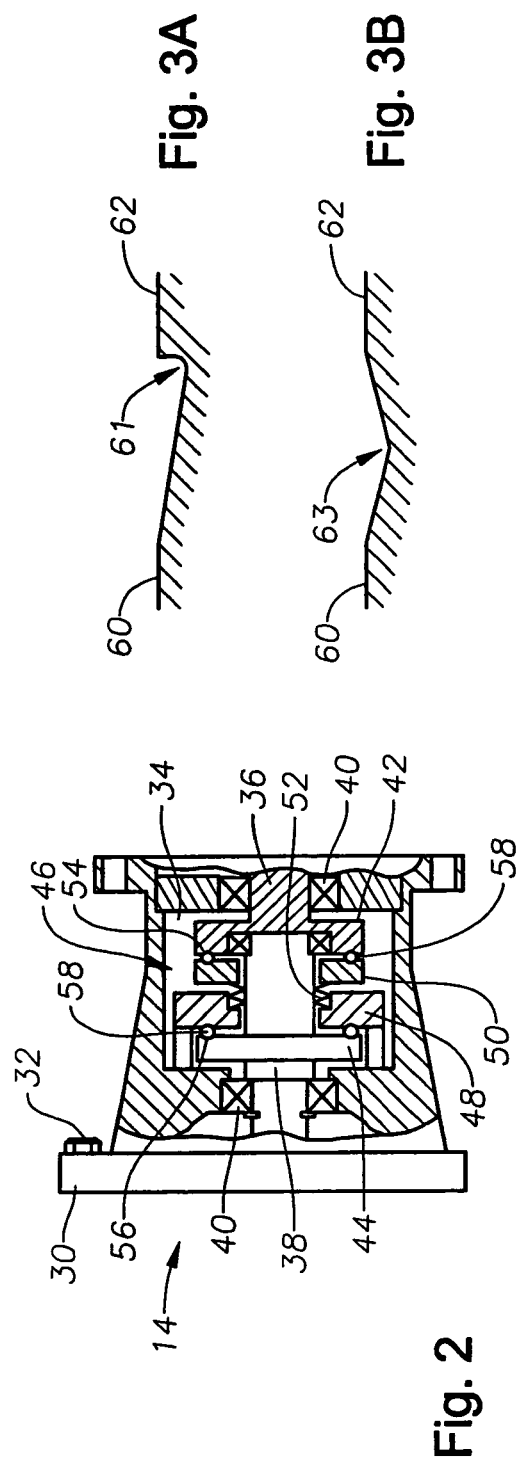

HIGH EFFICIENCY BRAKE FOR AGRICULTURAL DRIVE SYSTEMS

BACKGROUND OF THE INVENTION

1. Field of the Invention

The present invention relates to the field of power transmission for use in mechanized agricultural equipment, and more particularly to a high efficiency drive train incorporating an internal brake to prevent freewheeling.

2. Description of the Prior Art

Center pivot and linear irrigation systems are well known in the art for their ability to irrigate large sections of land. Typically, such systems are capable of watering a quarter section of land, i.e., 160 acres, or more. A center pivot irrigation system generally comprises an elongated primary irrigation pipe that extends radially outward from a center pivot. When activated, the irrigation pipe rotates around the pivot, thereby watering the area that the irrigation system passes over and resulting in a circular pattern of water coverage about the central pivot point. The length of time involved in a 360 degree rotation of the irrigation pipe may be up to several days. Likewise, linear systems are comprised of similar irrigation pipes, but move linearly across sections of land to be irrigated.

In conventional irrigation systems, the elongated irrigation pipe or span is supported at spaced apart intervals by a plurality of wheeled towers. Extending between each set of adjacent towers is a truss arrangement utilized to support the span and the water deployment system. Sprinklers are located at spaced intervals along the length of the span or a parallel water conduit. The wheels of each tower are normally positioned perpendicular to the span to permit the tower to follow a prescribed path, either circular for center pivot systems or linear for linear systems.

Whether center pivot or linear, each tower is typically provided with a drivetrain to distribute motive power to the wheels and operable to move the tower in synchronization with the other towers such that the overall length of the span can be maintained in substantially a straight line as the irrigation system moves through its prescribed path. In most conventional systems, the drivetrain consists of a motor, a divider gearbox, at least one drive shaft, at least one wheeldrive gearbox and at least one wheel hub. More specifically, either an electric or hydraulic motor, referred to as a center drive or drive gear motor, is coupled to a divider gearbox centrally located along the base of the tower. The divider gearbox is used to reduce the power input from the motor and divide the power output for transmission to the powered wheel hubs typically positioned at the outer edge of the tower's base. Each wheel hub is attached to a wheel drive gearbox and is driven by a driveshaft extending from the power output shaft of the divider gearbox. Since such irrigation systems may take several days to complete a single watering cycle rotation, the output revolutions per minute of the center drive motors and drive shafts are geared to be very low, generally in the range of 28–86 rpm.

Turning to the divider gearbox and motor assembly centrally located on each tower, the traditional systems of the prior art typically incorporate worm gears as the gearing configuration to transfer power from the motor to the divider gearbox. Specifically, a vertical center motor drive is attached to a worm gear set in which a worm thread on a shaft engages a worm gear. Worm gear boxes are often desirable in applications such as agricultural irrigation systems where the output revolutions per minute are required to be very low and necessitate a large gear reduction.

Notwithstanding the foregoing, it is common that irrigation systems are often used on uneven, sloping or even hilly ground. To the extent such equipment is positioned on an incline, there is a concern that the machinery could roll uncontrolled down the incline as the output shaft "back drives", i.e., rolling backwards down a hill, or "forward drives", i.e., rolling forwards down a hill, the gearing. Such uncontrolled motion can result in damage to the drivetrain and the irrigation equipment itself. For this reason, it has also been desirable heretofore for prior art irrigation system drivetrains to incorporate worm gears for their braking characteristics. It is well known in the art that one characteristic of a worm gear set is that the threaded shaft can easily turn the worm gear, but because of the helix angle of the threads on the shaft, friction between the shaft threads and the worm gear prevents the worm gear from turning, i.e., back driving or forward driving, the shaft. This locking feature can act as a brake for the drivetrain when the motor is not operating. Thus, prior art drivetrains for irrigation systems have utilized worm gears to prevent backdriving or forward driving of the drivetrain on an incline.

For the reasons set forth above, worm gears and gearsets are an integral part of the irrigation system drivetrains of the prior art. However, one drawback to standard worm gearsets is that they typically have efficiencies of only about 50%. Specifically, the efficiency of a gearset is measured in part by the input power lost at output by the gearset due to friction. Because worm gears are a friction gear mesh, the friction between the worm gear set results in elevated heat and loss of power, thereby decreasing efficiency.

Notwithstanding the foregoing, electromechanical brakes have also been utilized in the prior art in an attempt to prevent backdriving and forward driving. Because of the electrical components incorporated in such a brake, these brakes are generally enclosed. However, the extreme weather conditions of cold, heat and precipitation often result in a buildup of condensation within even an enclosed case. Because of this environment, the brake components have a tendency to rust. This becomes a particular problem when the machinery has been idle for a period of time, such as during the winter season. In such cases, the brake components often rust bond together, rendering the brake inoperable. In addition to any resultant rusting to the brake components, this moisture can cause malfunction of the electrical components of the brake. Thus, such electromechanical brakes have been found to be undesirable for use in the drivetrain of agricultural irrigation equipment.

Therefore, it would be desirable to provide a high efficiency drive train for agricultural irrigation equipment. The drive train should include a braking mechanism to inhibit freewheeling from the higher efficiency characteristics of the drivetrain. The braking mechanism is preferably mechanically operable and minimizes the likelihood that condensation or corrosion could damage the mechanism.

SUMMARY OF THE INVENTION

These and other objects are achieved through the high efficiency drivetrain of the present invention. The drivetrain includes a ball ramp brake to inhibit movement of the wheel tower when the drive gear motor is not driving. In one embodiment, the ball ramp brake is bi-directional. More specifically, the drivetrain comprises a bi-directional ball ramp brake disposed between the drive gear motor and the divider gearbox of the drivetrain. Utilizing a ball ramp brake such as this, the divider gearbox can incorporate much more highly efficient gearing mechanisms, such as for example only, involute gears, beveled gears, planetary gears or the like. The ball ramp brake is enclosed and includes an oil bath that functions to lubricate the components of the brake. Since the brake is enclosed and operates in a wet environment, i.e., the lubricant contained in the brake enclosure surrounds the brake, rusting and other corrosion problems experienced in the prior art are minimized. An additional benefit to such a brake is that the lubricant also dissipates heat generated by the brake, yielding a longer operational life. In one embodiment of the invention, the brake is enclosed within the divider gearbox housing.

BRIEF DESCRIPTION OF THE DRAWINGS

FIG. 1 is a top view of the irrigation system driveline of the current invention.

FIG. 2 is a cut-away side view of the bi-directional ball ramp brake of the drivetrain.

FIG. 3A is a cut-away, side view illustration of a unidirectional ball ramp.

FIG. 3B is a cut-away side view illustration of a bi-directional ball ramp.

DETAILED DESCRIPTION OF THE PREFERRED EMBODIMENTS

Figure 4:
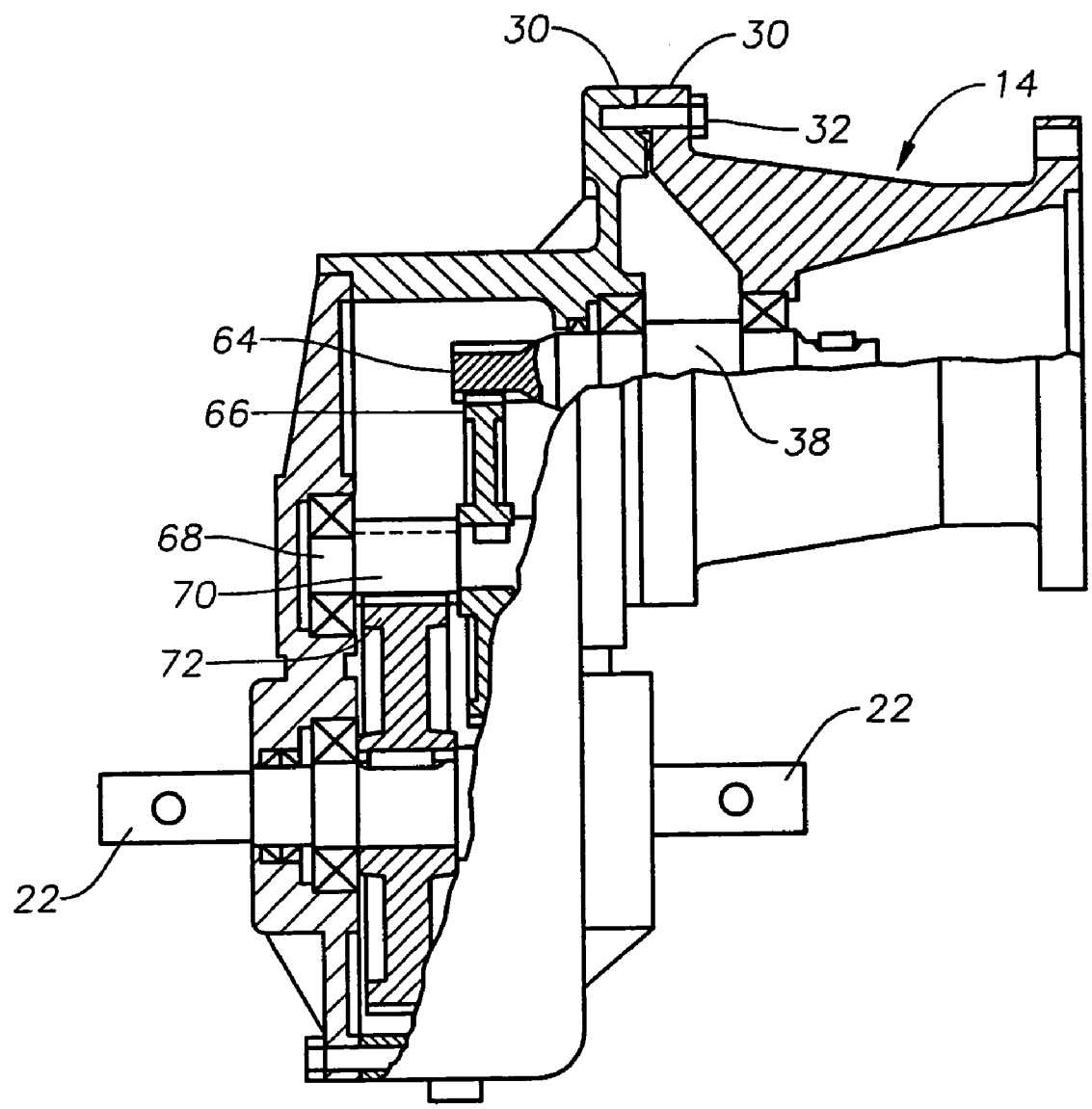
FIG. 4 is a partial cut-away side view of one configuration of a gearbox of the drivetrain.

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

With reference to FIG. 1, an agricultural irrigation system drivetrain 10 is illustrated. Drivetrain 10 generally comprises a drive gear motor 12, a ball ramp brake 14, a divider gearbox 16, a wheel drive gearbox 18 and a wheel hub 20. Ball ramp brake 14 is disposed between drive gear motor 12 and divider gearbox 16. An output shaft 22 from divider gearbox 16 is coupled to the input shaft 24 of wheel drive gearbox 18 by a drive shaft 26.

In the embodiment illustrated in FIG. 1, the enclosures for brake 14 and divider gearbox 16 are separate. Specifically, ball ramp brake 14 includes enclosure 26 while divider gearbox 16 includes enclosure 28. Although enclosures 26, 28 may be attached utilizing any standard means, in the embodiment of FIG. 1, each of enclosures 26, 28 includes mounting flanges 30 that permits the enclosures to be attached to one another utilizing fasteners 32. Enclosure 26 may be at least partially filled lubricant 34. Likewise, enclosure 28 may also be filled with a lubricant.

Ball ramp brake 14 is more specifically illustrated in FIG. 2. As shown in FIG. 2, a motor drive shaft 36 extending from motor 12 is axially aligned with a brake drive shaft 38. Each drive shaft 36, 38 is mounted on bearings 40. Motor drive shaft 36 includes an axially aligned motor drive plate 42. Likewise, brake drive shaft 38 includes an axially aligned brake drive plate 44, mounted so as to be parallel with, but set off from, motor drive plate 42. Slidingly mounted on brake drive shaft 38 between drive plates 42 and 44 is a ball ramp assembly 46. Ball ramp assembly 46 includes a first axial ball ramp plate 48 and a second axial ball ramp plate 50, disposed on brake drive shaft 38 such that first ball ramp plate 48 is adjacent brake plate 44 while second ball ramp plate 50 is adjacent motor drive plate 42. A biasing element disposed between first and second ball ramp plates 48, 50 urges second ball ramp plate 50 towards motor drive plate 42.

Disposed in at least one of the adjacent surfaces of second ball ramp plate 50 and motor drive plate 42 is a groove 54. Similarly, disposed in at least one of the adjacent surfaces of first ball ramp plate 48 and brake plate 44 is a groove 56. While not necessary for the practice of the invention, each opposing plate may include opposing grooves, such that plate 50 and plate 42 each include a groove 54, while plate 48 and plate 44 each include a groove 56. Disposed within each groove 54, 56 is a ball 58.

Those skilled in the art will understand that grooves 54, 56 may be unidirectional or bi-directional. As illustrated in FIGS. 3A and 3B, grooves 54, 56 extend from a first end 60 to a second end 62. In the case of a unidirectional groove as illustrated in FIG. 3A, the groove depth increases along the length of the groove between the first end 60 and the second end 62 forming a "taper" or "ramp" such that the groove depth is deepest adjacent one of the ends, such as is shown at 61. In the case of a bi-directional groove as illustrated in FIG. 3B, the groove depth is deepest approximately midway between the first end 60 and second end 62, illustrated at 63, and becomes shallower adjacent the ends 60, 62. While the preferred embodiment utilizes a bi-directional ball ramp brake 14 as described above, the particular groove configuration and shape is not intended as a limitation and can be of any configuration and shape consistent with the use of a ball ramp brake. Ball 58 rides in a groove such that turning of one plate relative to the adjacent plate, such as plates 42 and 50, causes ball 58 to ride or move up a ramp, forcing the plates apart and thereby applying greater and greater braking force between the plates.

The above described embodiment may be utilized either in a centerdrive configuration in which an output is split to drive multiple wheels or the embodiment may be implemented separately at each wheel. In this second configuration, the motor, ball ramp brake and gearset are integrally incorporated into a drive system at each wheel, thereby eliminating the need for a centerdrive system and driveshafts.

Although any type of high efficiency gear may be utilized in conjunction with ball ramp brake 14, in the embodiment illustrated in FIG. 4, gearbox 16 is a parallel shaft divider gearbox. Specifically, brake drive shaft 38 extends into gearbox 16 and is threaded at 64. Threads 64 engage involute gear 66 which in turn rotates shaft 68 threaded at 70. Threads 70 are engaged by involute gear 72 which rotates gearbox output shaft 22. Those skilled in the art will understand that involute gears meshed in a worm gear drive are much more efficient than standard spur gears due to friction and thus increase the performance of the irrigation drivetrain. As a non-limiting example, high efficiency gearsets are generally considered to be at least 80% efficient, however, it has been found that the invention is desirable for use with any gearsets, including worm gears sets, that are arranged to have efficiencies greater than 50%.

Of course, while a parallel shaft gearbox with an involute gear is illustrated, any type of drive gearbox or gearset may be utilized with the invention, such as, for example only, beveled gears, planetary gears, hypoid gears or even lower efficiency gears such as worm gears. In one embodiment, a standard double planetary gear may be replaced with a single planetary gearset and a hypoid gearset, thereby permitting a broader range of drive angles. In any event, it has been found that utilization of a ball ramp brake is particularly significant for high efficiency gears since such gearsets do not have the same inherent "braking" ability characteristic of standard worm gears of the prior art. In this same vein, while the term "divider" may be used to describe the gearbox since it is most common in such gearboxes to divide the output to drive two or more driveshafts, references to a divider gearbox for purposes of the invention can include a gearbox with a single output. In any case, inclusion of a ball ramp brake in agricultural irrigation drivetrain 10 thus permits the use of much more efficient gearing while preventing the support tower from rolling forward or backward.

Those skilled in the art will understand that the particular type of ball ramp brake does not alter the invention. The ball ramp brake 14 described above is for illustrative purposes only and may include ball ramp mechanisms used for torque limiting as opposed to braking. What has been described may be referred to as brake, a friction clutch, a slip clutch or the like so long as it incorporates a ball ramp mechanism. In addition, the relative locations of the gearbox and ball ramp brake are not limiting. Specifically, the gearbox may be on the upstream input or downstream output side of the brake. In this same vein, the terms "output" and "input" to describe various driveline components, and in particular, driveline shafts, are used for convenience purposes only and are not intended to limit the overall inventive concept of inclusion of a ball ramp brake in an agricultural irrigation system driveline.

As mentioned above, the components of brake 14 are enclosed in enclosure 26. Although not necessary, enclosure 26 may be oil filled. The type of lubricant filling enclosures 26 can be any type necessary to meet the needs of the particular operating parameters of the ball ramp mechanism. In one embodiment, the lubricant is heavy machinery oil or gear oil.

In another preferred embodiment, enclosures 26 and 28 are integrated to form a single enclosure. One benefit to an integrated enclosure such as this is that the ball ramp brake 14 and gearbox 16 can share the same oil bath, thereby reducing maintenance.

The above described invention permits use of a high efficiency gearing mechanism in the drivetrain of an agricultural irrigation system. Because the ball ramp brake is mechanical in nature, it can operate in a "wet" environment without the drawbacks inherent in the prior art electrical braking mechanisms. For example, electric brakes require a certain amount of energy to keep the brake from deploying. Likewise, the consumption of additional electricity increases system motor size, span cable and wire diameter. Of course, the brake of the invention is also more efficient and does not created as much brake drag as prior art devices. By utilizing a bi-directional ball ramp, braking is applied whether torque is generated-upstream or downstream of the ball ramp brake. Furthermore, the use of a lubricant bath extends the operational life of the ball ramp brake both due to the lubricating effects on the brake components and by cooling the brake components during operation.

While certain features and embodiments of the invention have been described in detail herein, it will be readily understood that the invention encompasses all modifications and enhancements within the scope and spirit of the following claims.

What is claimed is:

1. In a driveline for an agricultural irrigation system, said driveline comprising:
    a drive gear motor;
    a ball ramp brake, wherein said ball ramp brake comprises a motor drive shaft having a motor drive plate axially aligned therewith, a brake drive shaft having a brake drive plate axially aligned therewith, a first ball ramp plate axially disposed between said brake plate and said motor plate so as to be parallel therewith, a groove formed within at least one of said plates, a ball disposed within said groove, a second ball ramp plate axially disposed between said brake plate and said motor plate so as to be parallel therewith and a biasing element disposed between said first and second ball ramp plates so as to urge said first and second ball ramp plates away from one another; and
    a gearbox coupled to said ball ramp brake.

2. The driveline of claim 1, wherein the ball ramp brake is disposed between drive gear motor and gearbox.

3. The driveline of claim 1, wherein said gearbox comprises a high efficiency gearset.

4. The driveline of claim 1, further comprising an enclosure enclosing said brake.

5. The driveline of claim 4, wherein a lubricant is disposed within said enclosure.

6. The driveline of claim 1, further comprising a wheel hub engaged by a wheel drive gearbox and a drive shaft coupled to said gearbox at a first end of said drive shaft and coupled to said wheel drive gearbox at a second end of said drive shaft.

7. The system of claim 4, wherein said enclosure encloses the gearbox and the ball ramp brake.

8. The driveline of claim 4, further comprising an enclosure around the gearbox.

9. The driveline of claim 1, wherein said first ball ramp plate is adjacent said brake drive plate and said second ball ramp plate is adjacent said motor drive plate.

10. The driveline of claim 9, wherein a groove is defined in at least one of said first ball ramp plate and brake drive plate and at least one of said second ball ramp plate and motor drive plate, wherein a ball is disposed in each of said grooves.

11. The driveline of claim 1, wherein said groove is defined by a first end and a second end and includes a groove surface tapered from said first end to said second end.

12. The driveline of claim 1, wherein said groove is defined by a first end, a second end and a mid-portion, and includes a groove surface tapered between said mid-portion and said first end.

13. The driveline of claim 11, wherein said taper is defined by a taper depth and said taper depth increases from said first end to said second end.

14. The driveline of claim 12, wherein said taper is defined by a taper depth and said taper depth increases from said first end to said mid-portion.

15. The driveline of claim 12, wherein said taper is defined by a taper depth and said taper depth decreases from said mid-portion to said first end.

16. The driveline of claim 12, wherein said taper is defined by a taper depth and said taper depth increases from said first end to said mid-portion and thereafter said taper depth decreases from said mid-portion to said second end.

17. The driveline of claim 9, wherein at least one of said opposing sets of plates includes a groove the surface of each opposing plate.

18. The driveline of claim 3, wherein said high efficiency gearset comprises an involute gear.

19. The driveline of claim 4, wherein said enclosure is sealed.

20. The driveline of claim 3, wherein said high efficiency gearset comprises a right angle gear.

21. The driveline of claim 5, wherein said lubricant substantially fills said enclosure.

22. In driveline for an agricultural irrigation system, said driveline comprising:
- a drive gear motor coupled to a drive plate;
- a first gearbox coupled to a gearbox plate; and
- a ball ramp brake coupled between said drive gear motor and said first gearbox, wherein said ball ramp brake comprises first and second ball ramp plates disposed between said drive plate and said gearbox plate, a groove formed within at least one of said plates with a ball disposed within said groove and a biasing element disposed between said first and second ball ramp plates.

23. The driveline of claim 22, further comprising an enclosure enclosing said ball ramp brake, said enclosure containing a lubricant disposed within said enclosure.

24. The driveline of claim 22 wherein the ball ramp brake is bi-directional.

25. The driveline of claim 22 wherein the first gearbox is a high efficiency gearbox.

* * * * *